(12) United States Patent
Dean et al.

(10) Patent No.: US 8,439,268 B2
(45) Date of Patent: May 14, 2013

(54) STORED-VALUE CARD WITH MULTIPLE MEMBER HOUSING

(75) Inventors: Gaye B. Dean, Maple Grove, MN (US); Ted C. Halbur, Lino Lakes, MN (US); Dave B. Smith, St. Paul, MN (US); Timothy P. Clegg, Manhatten Beach, CA (US)

(73) Assignee: Target Brands, Inc., Minneapolis, MN (US)

( * ) Notice: Subject to any disclaimer, the term of this patent is extended or adjusted under 35 U.S.C. 154(b) by 172 days.

(21) Appl. No.: 12/843,744

(22) Filed: Jul. 26, 2010

(65) Prior Publication Data

US 2010/0288836 A1    Nov. 18, 2010

Related U.S. Application Data

(63) Continuation of application No. 12/250,411, filed on Oct. 13, 2008, now Pat. No. 7,770,802, which is a continuation of application No. 11/846,997, filed on Aug. 29, 2007, now Pat. No. 7,434,735, which is a continuation of application No. 11/038,011, filed on Jan. 18, 2005, now Pat. No. 7,290,713.

(51) Int. Cl.
*G06K 7/00*    (2006.01)

(52) U.S. Cl.
USPC ............................. 235/487; 235/488; 235/493

(58) Field of Classification Search .................. 235/487, 235/492

See application file for complete search history.

(56) References Cited

U.S. PATENT DOCUMENTS

| | | | |
|---|---|---|---|
| 3,351,268 | A | 11/1967 | Schroeder |
| 4,055,014 | A | 10/1977 | Schmidt et al. |
| 4,299,041 | A | 11/1981 | Wilson |
| 4,791,741 | A | 12/1988 | Kondo |
| D305,887 | S | 2/1990 | Nishimura |
| 5,063,698 | A | 11/1991 | Johnson et al. |
| 5,275,285 | A | 1/1994 | Clegg |
| 5,326,964 | A | 7/1994 | Risser |
| 5,328,026 | A | 7/1994 | Newman |

(Continued)

FOREIGN PATENT DOCUMENTS

GB    2277482 A    11/1994

OTHER PUBLICATIONS

"Credit Union tech-talk," www.cunews.com/newsletters/2004419.htm, Apr. 19, 2004, 8 pages.

(Continued)

*Primary Examiner* — Daniel Hess
(74) *Attorney, Agent, or Firm* — Griffiths & Seaton PLLC

(57) ABSTRACT

A financial transaction card includes a first member, a second member, a side wall, at least one substantially rigid connection member, and an account identifier. The first member defines a first panel, and the second member defines a second panel. Each of the first panel and the second panel are substantially planar. The side wall extends between the first panel and the second panel such that the first panel is spaced from the second panel to define a void between the first panel and the second panel. The at least one substantially rigid connection member extends through the first member and interfaces with the second member to at least partially couple the first member to the second member. The account identifier associates the financial transaction card with an account or record having a value associated therewith. Other cards, assemblies and associated methods are also disclosed.

15 Claims, 11 Drawing Sheets

U.S. PATENT DOCUMENTS

| | | | |
|---|---|---|---|
| 5,359,374 | A | 10/1994 | Schwartz |
| 5,387,108 | A | 2/1995 | Crowell |
| 5,539,819 | A | 7/1996 | Sonoyama et al. |
| 5,577,918 | A | 11/1996 | Crowell |
| 5,627,355 | A | 5/1997 | Rahman et al. |
| 5,641,164 | A | 6/1997 | Doederlein et al. |
| 5,769,213 | A | 6/1998 | Chatterton |
| 5,774,861 | A | 6/1998 | Spector |
| 5,777,305 | A | 7/1998 | Smith et al. |
| 5,778,574 | A | 7/1998 | Reuben |
| 5,789,733 | A | 8/1998 | Jachimowicz et al. |
| 5,927,846 | A | 7/1999 | Sinclair |
| 6,019,284 | A | 2/2000 | Freeman et al. |
| 6,028,752 | A | 2/2000 | Chomette et al. |
| 6,045,050 | A * | 4/2000 | Ippolito et al. ............... 235/492 |
| 6,068,183 | A | 5/2000 | Freeman et al. |
| 6,070,990 | A | 6/2000 | Dalton et al. |
| D429,733 | S | 8/2000 | Jones et al. |
| 6,109,762 | A | 8/2000 | Hallgrimsson et al. |
| D436,991 | S | 1/2001 | Morgante |
| 6,193,163 | B1 | 2/2001 | Fehrman et al. |
| 6,305,609 | B1 | 10/2001 | Melzer et al. |
| 6,356,626 | B1 | 3/2002 | Ohara et al. |
| 6,402,039 | B1 | 6/2002 | Freeman et al. |
| 6,439,613 | B2 | 8/2002 | Klure |
| 6,447,143 | B2 | 9/2002 | Krietzman et al. |
| 6,454,435 | B1 | 9/2002 | Altman |
| 6,508,569 | B2 | 1/2003 | Krietzman et al. |
| 6,533,436 | B2 | 3/2003 | Krietzman et al. |
| 6,571,940 | B2 | 6/2003 | Newman |
| 6,607,136 | B1 | 8/2003 | Atsmon et al. |
| 6,666,378 | B2 | 12/2003 | Davila et al. |
| 6,671,358 | B1 | 12/2003 | Seidman et al. |
| 6,718,013 | B2 | 4/2004 | Turner et al. |
| 6,769,618 | B1 | 8/2004 | Finkelstein |
| 6,808,514 | B2 | 10/2004 | Schneider et al. |
| 6,817,532 | B2 | 11/2004 | Finkelstein |
| 6,883,718 | B1 | 4/2005 | Le et al. |
| 6,902,116 | B2 | 6/2005 | Finkelstein |
| 7,004,398 | B1 | 2/2006 | Francis et al. |
| 7,024,807 | B2 | 4/2006 | Street |
| D523,076 | S | 6/2006 | Lauer et al. |
| 7,264,155 | B2 | 9/2007 | Halbur et al. |
| 7,290,714 | B2 | 11/2007 | Halbur et al. |
| 7,376,564 | B2 | 5/2008 | Selg et al. |
| 2001/0030863 | A1 | 10/2001 | Contant et al. |
| 2002/0017759 | A1 | 2/2002 | McClung, III et al. |
| 2002/0053594 | A1 | 5/2002 | Haney et al. |
| 2002/0066789 | A1 | 6/2002 | Yen |
| 2002/0143697 | A1 | 10/2002 | Gotfried |
| 2002/0169608 | A1 | 11/2002 | Tamir et al. |
| 2003/0022586 | A1 | 1/2003 | Beged-Dov |
| 2003/0106935 | A1 | 6/2003 | Burchette, Jr. |
| 2003/0107884 | A1 | 6/2003 | Krietzman et al. |
| 2003/0132300 | A1 | 7/2003 | Dilday et al. |
| 2003/0155425 | A1 | 8/2003 | Lynch |
| 2004/0028235 | A1 | 2/2004 | Pan |
| 2004/0032732 | A1 | 2/2004 | Rubin |
| 2004/0055188 | A1 | 3/2004 | Dolan-King |
| 2004/0238625 | A1 | 12/2004 | Walker et al. |
| 2005/0006463 | A1 | 1/2005 | Stephenson |
| 2005/0029349 | A1 | 2/2005 | McGregor et al. |
| 2005/0090181 | A1 | 4/2005 | Helou |
| 2005/0155618 | A1 | 7/2005 | Lafferty |
| 2005/0204600 | A1 | 9/2005 | Lauer et al. |
| 2005/0207165 | A1 | 9/2005 | Shimizu et al. |
| 2005/0211785 | A1 | 9/2005 | Ferber et al. |
| 2005/0236490 | A1 | 10/2005 | Fortune et al. |
| 2005/0247795 | A1 | 11/2005 | Riedl et al. |
| 2006/0108429 | A1 | 5/2006 | Waters |
| 2006/0157556 | A1 | 7/2006 | Halbur et al. |
| 2006/0161439 | A1 | 7/2006 | Selg et al. |
| 2007/0215694 | A1 | 9/2007 | Clegg |
| 2007/0290052 | A1 | 12/2007 | Dean et al. |
| 2008/0197202 | A1 | 8/2008 | Selg et al. |

OTHER PUBLICATIONS

Kathleen M. Joyce, "Live from the Motivation Show 2003: AEIS Launches Two Recognition Programs," http://promomagazine.com/news/marketing_live_motivation_show_2/, Sep. 18, 2003, 2 pages.

Depiction of American Express card holder and prepaid card reported to have been publicly offered for sale in 2003.

Depiction of Bob's Stores card holder and prepaid card reported to have been publicly offered for sale in 2002.

Depiction of Yankee Candle card holder and prepaid card reported to have been publicly offered for sale in 2002.

* cited by examiner

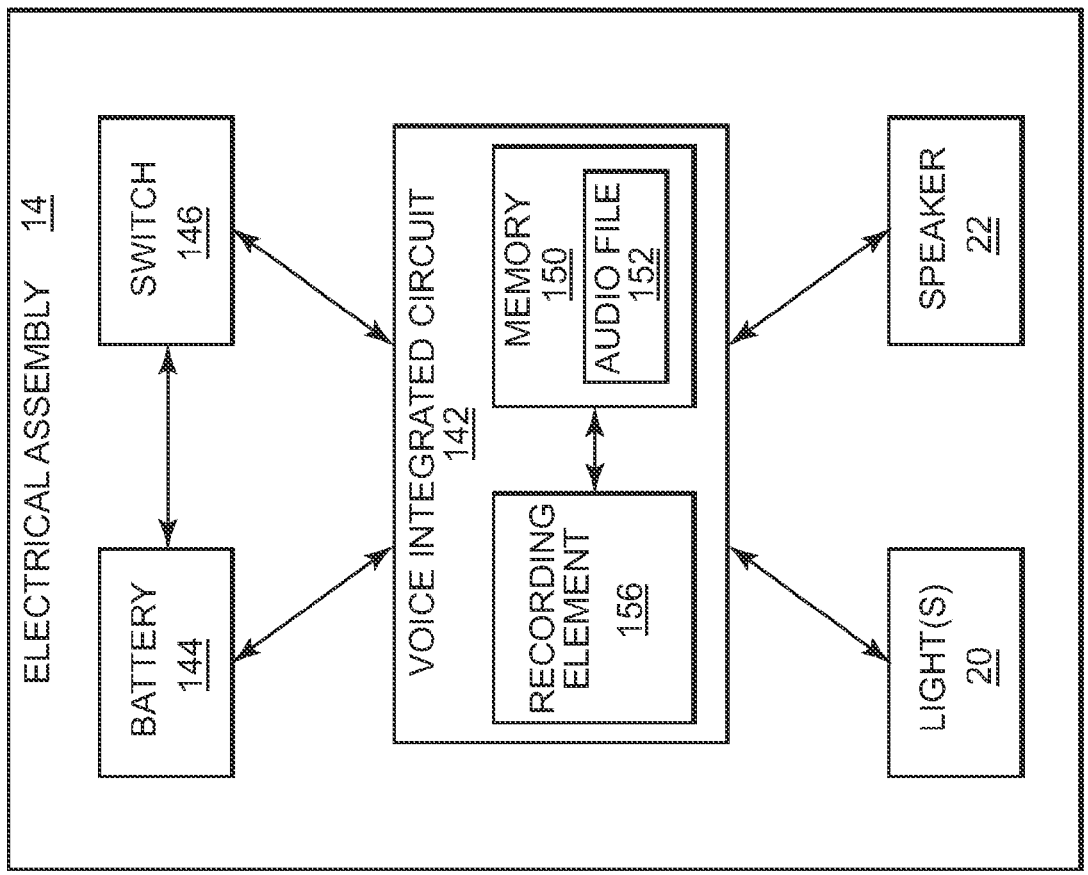

STORED-VALUE CARD WITH MULTIPLE MEMBER HOUSING

CROSS-REFERENCE TO RELATED APPLICATION

This application is a continuation of and claims priority under 35 U.S.C. §120 to U.S. patent application Ser. No. 12/250,411, which is a continuation of U.S. patent application Ser. No. 11/846,997, now U.S. Pat. No. 7,434,735, filed Aug. 29, 2007, which is a continuation of U.S. patent application Ser. No. 11/038,011, now U.S. Pat. No. 7,290,713, filed Jan. 18, 2005, all of which are incorporated herein in their entireties.

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a financial transaction card including a first member, a second member, a side wall, at least one substantially rigid connection member, and an account identifier. The first member defines a first panel, and the first panel is substantially planar. The second member defines a second panel, and the second panel is substantially planar. The second member is formed as a separate piece as compared to the first member. The side wall extends between the first panel and the second panel such that the first panel is spaced from the second panel to define a void between the first panel and the second panel. The at least one substantially rigid connection member extends through the first member and interfaces with the second member to at least partially couple the first member to the second member. The account identifier associates the financial transaction card with an account or record having a value associated therewith such that the financial transaction card is configured for use toward the purchase price of one or more of goods and services. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 5A is a block diagram of the electrical assembly of FIG. 5.

DETAILED DESCRIPTION

A gift card or other stored-value card is adapted for making purchases of goods and/or services from, e.g., a retail store or website. According to one embodiment, an original consumer buys the stored-value card to give a recipient who in turn is able to use the stored-value card at a retail store or setting to pay for goods and/or services. The stored-value card, according to embodiments of the present invention, provides the consumer and recipient with extra amusement in addition to the ability to pay for goods and/or services with the stored-value card.

In particular, the stored-value card provides a bearer of the stored-value card with a collective audio and visual presentation that includes viewing decorative indicia of the stored-value card, hearing an audio file related to the decorative indicia, and illuminating a light included in the stored-value card. In one embodiment, the collective audio and visual presentation not only amuses the bearer, but also entices potential consumers to buy and/or load the stored-value card.

In some embodiments, the audio file of the stored-value card is related to a particular occasion or life event, such as a wedding, new baby, graduation, holiday, season, etc. The audio file may also relate to printed indicia on the stored-value card for unifying the overall presentation of the audio file and the stored-value card to the customer and/or recipient. In one embodiment, the light is incorporated to further enhance the appearance of the indicia. For example, in the case of a stored-value card relating to a movie, book, video game, or television show with a warrior or fighting character, the indicia depict the warrior, the light illuminates the sword of the warrior, and the sound conveys a voice or other audio expression or audio file readily associated with the warrior, movie, book, video game, or television show. Accordingly, the customer and/or recipient can enjoy the amusement of the audio and visual presentation, and can also use the stored-value card to shop for gift or other items.

Figure 1:
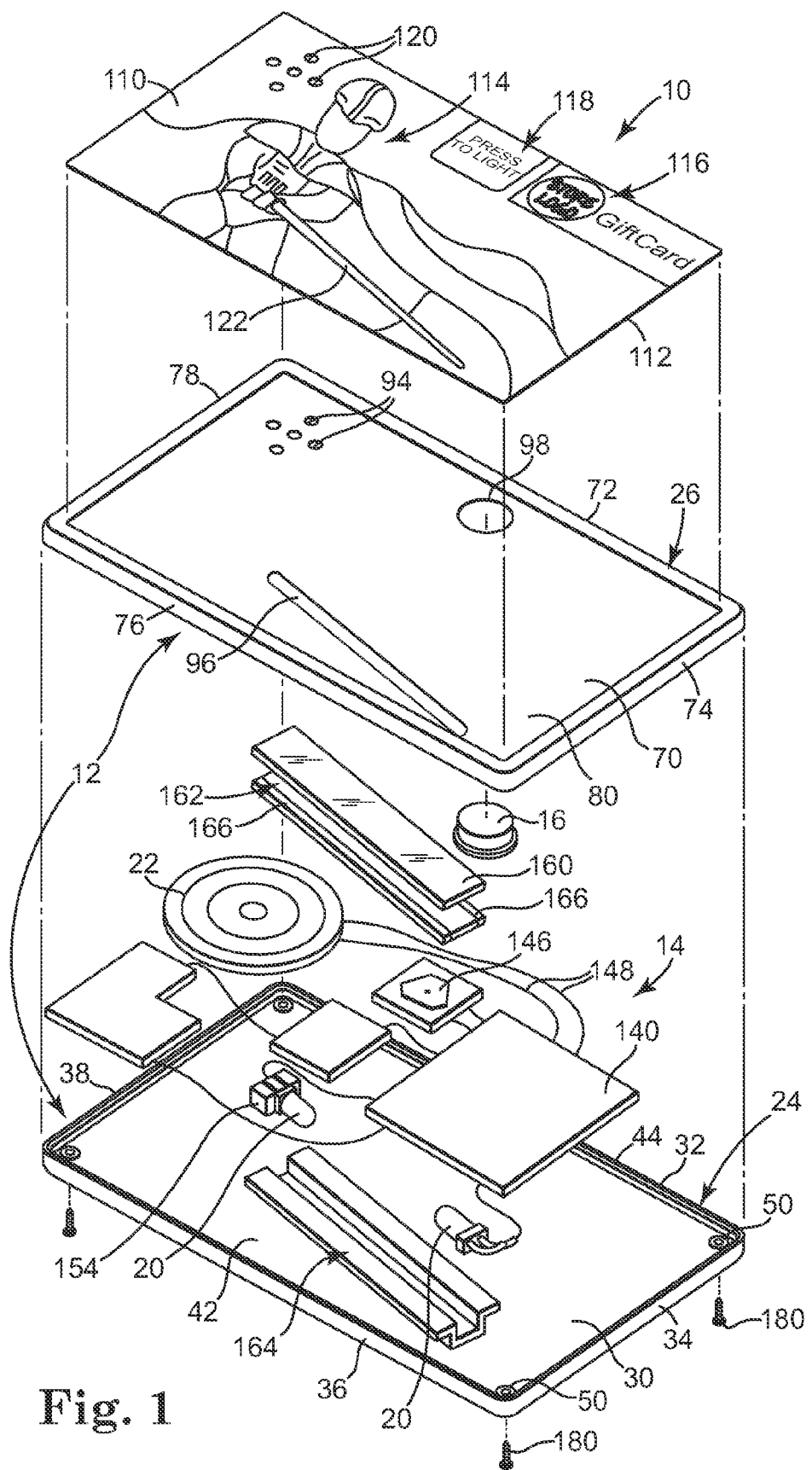
FIG. 1 is an exploded, top perspective view of one embodiment of a stored-value card, according to the present invention.

Turning to the figures, FIG. 1 illustrates an exploded, top perspective view of one embodiment of a stored-value card according to the present invention generally at 10. Stored-value card 10 includes a housing 12, an electrical assembly 14, a button 16, and a face panel 18. Electrical assembly 14 stores an audio file and includes a light 20 and a speaker 22. Electrical assembly 14 is generally enclosed within housing 12. Button 16 is at least partially housed within housing 12 and is configured to interact with electrical assembly 14. In particular, upon depression of button 16 by a user, electrical assembly 14 is activated to illuminate light 20 and to play the audio file via speaker 22. Face panel 18 is optionally coupled to housing 12 to provide stored-value card 10 with indicia relating to one or more of an occasion, season, store identifier, brand identifier, media format indicia (e.g. characters, logos, scenes, or other illustrations or photographs relating to at least one of a movie, television show, book, video game, etc.), a sport, etc.

Figure 2A:
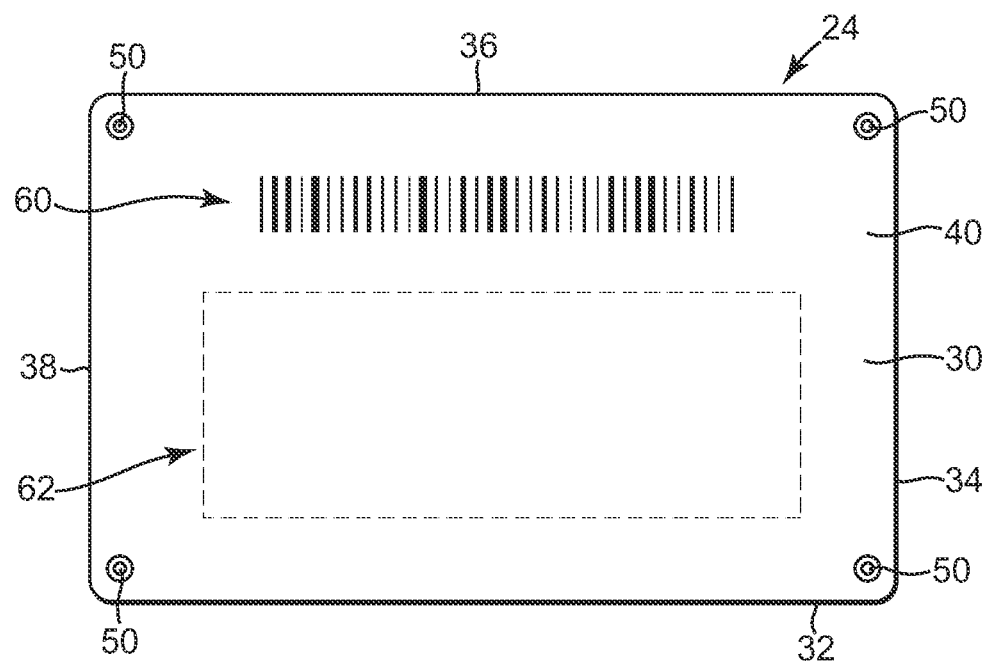
FIG. 2A is a bottom view of one embodiment of a base the stored-value card of FIG. 1, according to the present invention.
Figure 2B:
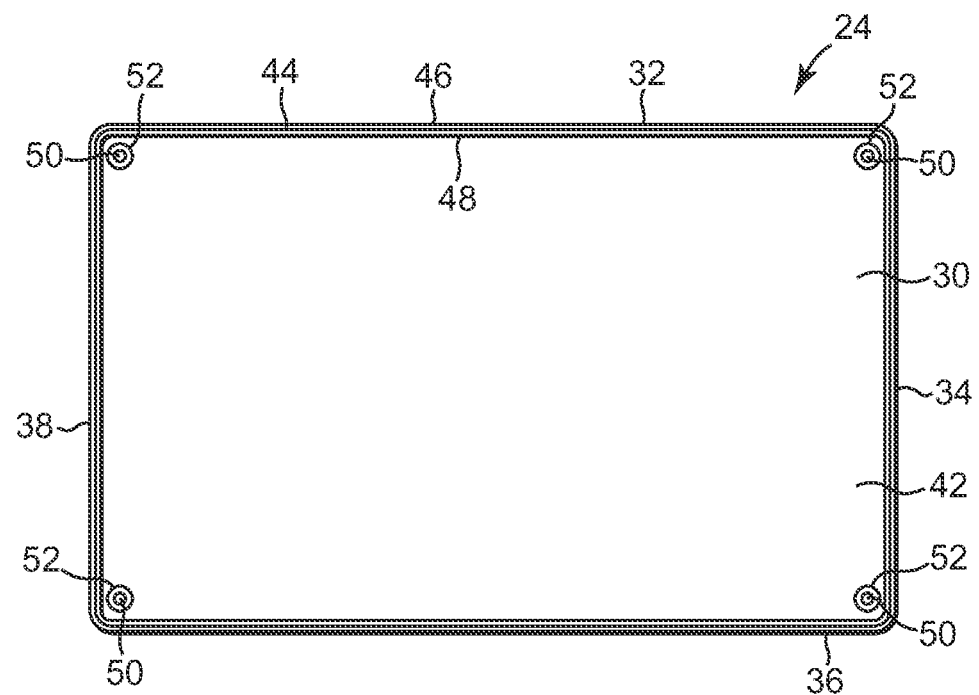
FIG. 2B is a top view of one embodiment of the base of FIG. 2.

Housing 12 includes a first housing member 24 and a second housing member 26. In one embodiment, first housing member 24 is a base, and second housing member 26 is a cover. One embodiment of base 24 is illustrated in FIGS. 2A and 2B. Base 24 generally includes a primary panel 30 and side walls 32, 34, 36, and 38. Primary panel 30 is generally planar and defines an outside surface 40 and an inside surface 42 opposite outside surface 40. In one embodiment, primary panel 30 is generally rectangular and sized similarly to an identification card, a credit card, or other card sized to fit in a wallet of a user. In other embodiments, primary panel 30 is otherwise shaped as a square, circle, oval, star, or any other suitable shape.

Side walls 32, 34, 36, and 38 each extend from inside surface 42 away from outside surface 40 and collectively extend generally about the entire perimeter of primary panel 30. In one embodiment, each side wall 32, 34, 36, and 38 extends with a generally perpendicular orientation relative to primary panel 30. In particular, first side wall 32 extends generally parallel to and is positioned opposite third side wall 36. Second side wall 34 and fourth side wall 38 each extend between first side wall 32 and third side wall 36 opposite and generally parallel to one another.

Each side wall 32, 34, 36, and 38 extends from primary panel 30 to collectively define an inside edge 44 opposite primary panel 30. In one example, inside edge 44 is formed as a stepped edge including a first portion 46 and a second portion 48. First portion 46 extends from primary panel 30 a further distance than second portion 48 extends from primary panel 30, as illustrated with additional reference to FIG. 1. In one example, first portion 46 extends generally about the perimeter of second portion 48. In this respect, inside edge 44 is formed as a stepped edge with the lower, second portion 48 being positioned just inside higher, first portion 46. In one embodiment, at least first portion 46 forms curved or chamfered corners at the intersection of each side wall 32, 34, 36, and 38 with another of side walls 32, 34, 36, and 38.

A plurality of apertures 50 extend through primary panel 30. More particularly, each aperture 50 extends from outside surface 40 through inside surface 42. In one embodiment, an aperture 50 is positioned near the intersection of each side wall 32, 34, 36, and 38 with another one of side walls 32, 34, 36, and 38. In one embodiment, apertures 50 are sized to at least partially receive a connection device, such as a screw or other substantially rigid device for coupling base 24 with cover 26. In one example, each aperture 50 allows the head of the screw or other attachment device to be recessed and, accordingly, includes a slightly larger section nearer outside surface 40 than near inside surface 42. In one embodiment, a cylindrical protrusion 52 extends from inside surface 42 around each aperture 50.

Outside surface 40 includes an account identifier 60 such as a bar code, magnetic strip, a smart chip or other electronic device, a radio frequency identification device, or other suitable identifier readily readable by a point-of-sale terminal or other account access station or kiosk. In one embodiment, account identifier 60 is printed on outside surface 40 of base 24. Account identifier 60 indicates a financial account or record to which stored-value card 10 is linked. The account or record of the monetary balance on stored-value card 10 optionally is maintained on a database, other electronic or manual record-keeping system, or, in the case of "smart" cards for example, on a chip or other electronics or devices on stored-value card 10 itself. Accordingly, by scanning account identifier 60, a financial account or record linked to stored-value card 10 is identified and can subsequently be activated, have amounts are debited therefrom, and/or have amounts added thereto. With the above in mind, account identifier 60 is one example of means for linking stored-value card 10 with a financial account or record.

In one embodiment, redemption indicia 62, which are generally indicated as a dashed box in FIG. 2A, are included on outside surface 40. Redemption indicia 62 indicate that stored-value card 10 is redeemable for the purchase of goods and/or services and that, upon use, a value of the purchased goods and/or services will be deducted from the financial account or record linked to stored-value card 10. In one embodiment, redemption indicia 62 include phrases such as "<NAME OF STORE> GiftCard" and "This GiftCard is redeemable for merchandise or services at any of our stores or at our web site," and/or provides help or phone line information in case of a lost, stolen, or damaged stored-value card, etc. In one embodiment, other indicia are also included on outside surface 40. In one example, redemption indicia 62 include the following or a similar statement:

This GiftCard is redeemable for merchandise or services at any of our stores or at our web site. This GiftCard is not redeemable for cash or credit except where required by law. No value until purchased. For balance information or to report a lost, stolen or damaged card, call 1-800-555-5555. We can replace the remaining value on a lost, stolen or damaged card with the original purchase receipt.

Figure 3A:
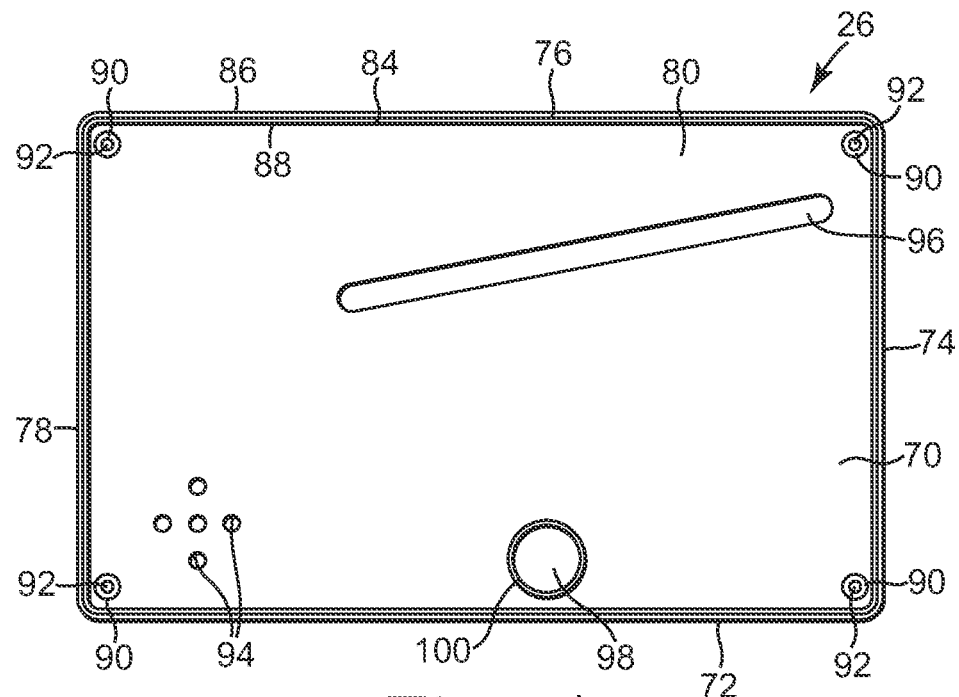
FIG. 3A is a bottom view of one embodiment of a cover of the stored-value card of FIG. 1, according to the present invention.
Figure 3B:
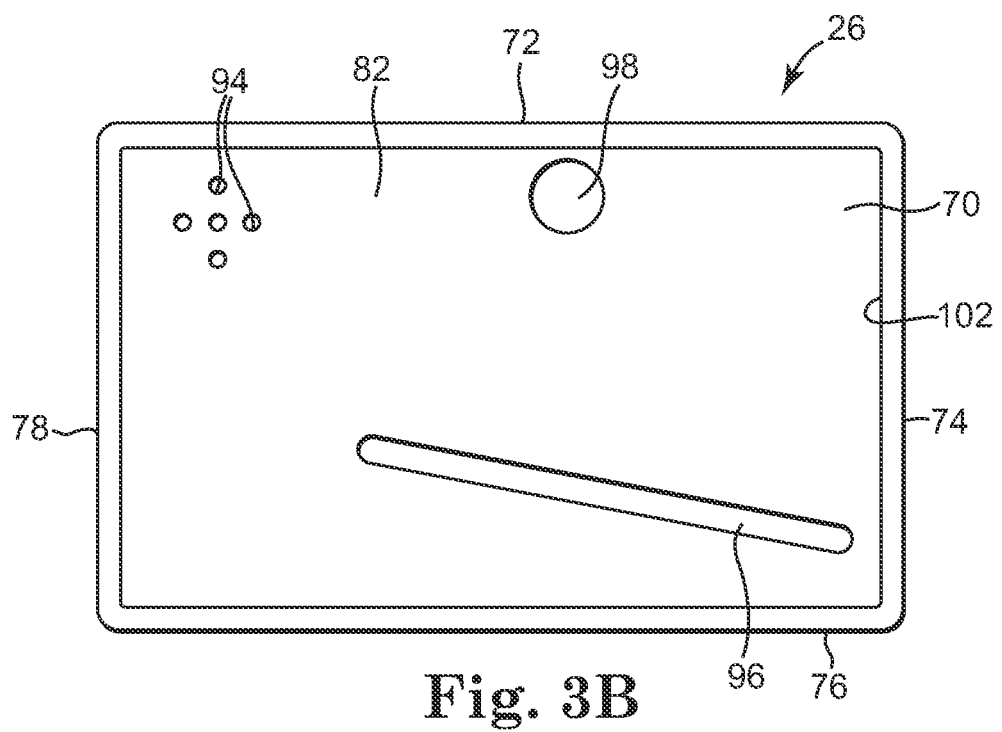
FIG. 3B is a top view of one embodiment of the cover of FIG. 3A.

One embodiment of cover 26 is illustrated in FIGS. 3A and 3B. Cover 26 generally includes a primary panel 70 and side walls 72, 74, 76, and 78. Primary panel 70 is generally planar and defines an outside surface 80 and an inside surface 82 opposite outside surface 80. In one embodiment, primary panel 70 is generally sized similarly to primary panel 30 of base 24. Side walls 72, 74, 76, and 78 each extend from inside surface 82 and collectively extend generally about the entire perimeter of primary panel 70. For example, each side wall 72, 74, 76, and 78 extends with a generally perpendicular orientation relative to primary panel 70. In particular, first side wall 72 is positioned opposite and generally parallel to third side wall 76. Second side wall 74 and fourth side wall 78 extend between first side wall 72 and third side wall 76 opposite and generally parallel to one another.

Each side wall 72, 74, 76, and 78 extends from primary panel 70 to collectively form an inside edge 84 opposite primary panel 70. In one embodiment, inside edge 84 is a stepped edge including a first portion 86 and a second portion 88. In one embodiment, first portion 86 extends from primary panel 70 a smaller distance than second portion 88 extends from primary panel 70. First portion 86 extends around the perimeter of second portion 88. In this respect, inside edge 84 is formed as a stepped edge with higher, second portion 88 being positioned just inside lower, first portion 86. In one embodiment, the corners of inside edge 84 formed at the intersections of side walls 72, 74, 76, and 78 with another of side walls 72, 74, 76, and 78 are rounded or chamfered.

Cover 26 includes a plurality of protrusions 90 extending from inside surface 82 parallel to side walls 72, 74, 76, and 78. One protrusion 90 is positioned near each of the corners of edge 84 (i.e. near the intersections of side walls 72, 74, 76, and 78 with another side wall 72, 74, 76, and 78). In one embodiment, each protrusion 90 extends further from inside surface 82 than each side wall 72, 74, 76, and 78 extend beyond inside surface 82. Each protrusion 90 is positioned on cover 26 to generally align with one of apertures 50 of base 24 upon assembly. A threaded cavity 92 is formed within each protrusion 90. In one embodiment, each threaded cavity 92 is configured to receive a screw or other connection device for coupling base 24 with cover 26.

In one example, a plurality of speaker apertures 94 are defined through primary panel 70. The plurality of speaker apertures 94 are configured to facilitate transfer of sound from speaker 22 out of stored-value card 10 during use. A light aperture 96 is defined through primary panel 70. Light aperture 96 is configured to allow light waves or illumination to exit stored-value card 10 from the at least one light 20. In one embodiment, the size and shape of light aperture 96 is dependent upon the overall aesthetic effect of stored-value card 10, as will be further described below. In one example, a plurality of light apertures 96 are defined in primary panel 70.

A button aperture 98 extends through primary panel 70 and is sized and shaped to receive button 16. In one embodiment, a raised rim 100 extends upward from inside surface 82 generally around the perimeter of button aperture 98. In one example, button aperture 98 and raised rim 100 are positioned to correspond with at least a portion of the positioning of electrical assembly 14, as will be further described below.

In view of the above, outside surface 80 partially defines button aperture 98, the plurality of speaker apertures 94, and the at least one light aperture 96. In addition, in one embodiment, a panel indentation 102 is defined by outside surface 80 and is sized and configured to receive face panel 18. In one embodiment, outside surface 80 is directly printed with or otherwise includes indicia relating to at least one of a brand, store identifier, holiday, occasion, character, sport, media formats indicia, etc.

In one embodiment, each of base 24 and cover 26 is formed by injection molding of a plastic such as PVC or any other suitable material to define the various attributes of base 24 and cover 26. Other methods of forming base 24 and cover 26 are also contemplated. In one embodiment, in which base 24 is formed by injection molding, account identifier 60, redemption indicia 62, and any other indicia or information are printed onto the injection molded base 24.

In one example, base 24 and cover 26 are each formed of materials having a similar or identical color. In other examples, base 24 and cover 26 may be formed of materials having different coloring. For instance, in one embodiment, base 24 is colored white to best display the printed account identifier 60, redemption indicia 62, etc. on its outer surface 40 while cover 26 is a different color to correspond with and/or complement the coloring of face panel 18.

Face panel 18 is generally planar and is formed of paper, plastic, or other suitable material. In one embodiment, face panel 18 is sized to fit within panel indentation 102 of cover 26. With this in mind, face panel 18 includes a first, outside surface 110 and a second, inside surface 112. First surface 110 includes indicia such as decorative indicia 114, brand indicia 116, and a button indicator 118. In one embodiment, decorative indicia 114 relate to a particular occasion or life event such as a wedding, new baby, graduation, holiday, season, etc., a particular character, brand identifier, media format identifier or other visual design to promote purchase of stored-value card 10. In one particular embodiment, decorative indicia 114 include a picture or a graphic representing a character of a particular media format.

Brand indicia 116 identify a brand associated with stored-value card 10, such as identifying a product brand, a store brand, other indicia readily associated with a product or store, etc. Indicia 114 and/or 116 is an example of means for associating stored-value card 10 with at least one of a product, a brand, a store, a holiday, a season, an occasion, and media format indicia.

Button indicator 118 is positioned on face panel 18 to generally align with button 16 upon assembly. In this respect, button indicator 118 indicates an area or location of stored-value card 10 where the bearer, e.g. the customer or recipient, can push stored-value card 10 to hear the stored audio file and illuminate light 20, as will be further described below. Other combinations or selections of indicia to be displayed on face panel 18 are also contemplated. In an alternate embodiment, indicia described to be included on face panel 18 are distinctly printed to cover 26. In one embodiment, first, outside surface 110 of face panel 18 is printed and finished in any one of a variety of manners such as matte, gloss, textured, or other effect finish. In one embodiment, the finish chosen for first, outside surface 110 further complements the indicia included on first, outside surface 110.

In one embodiment, face panel 18 includes a plurality of speaker apertures 120 extending throughout face panel 18 and configured to generally align with at least a portion of speaker apertures 94 of cover 26 upon assembly of stored-value card 10. In this respect, sound coming from electrical assembly 14 has a generally clear pathway through at least a portion of speaker apertures 94 of cover 26 and speaker apertures 120 of face panel 18.

In one example, at least one light aperture 122 extends through face panel 18. Light aperture 122 is positioned on face panel 18 to generally align with or otherwise correspond with the position of the at least one light 20 of stored-value card 10 upon assembly. As such, in one embodiment, light aperture 122 is positioned to generally align with light aperture 96 of cover 26 upon assembly of stored-value card 10. Accordingly, light aperture 122 permits light waves or illumination from light(s) 20 to escape housing 12 and to reach the bearer or other viewer of stored-value card 10. In one embodiment, light aperture 122 is positioned as part of or to correspond or complement at least a portion of decorative indicia 114. Otherwise stated, light aperture 122 depicts or represents a first portion of a subject or scene and decorative indicia depicts a second portion of the subject or scene to collectively depict the entire subject or scene. For example, when decorative indicia 114 include a warrior, light aperture 122 may be shaped and positioned as a sword being used by the warrior. Other configurations and combinations of decorative indicia 114 and light aperture(s) 122 are also contemplated.

Second, inside surface 112 is configured to interface with cover 26 within indentation 102. In one embodiment, face panel 18 is adhered to cover 26 with any suitable adhesive. In other embodiments, face panel 18 is formed on an adhesive backed plastic, paper, cardstock, etc. and is directly applied and adhered to cover 26.

Figure 4:
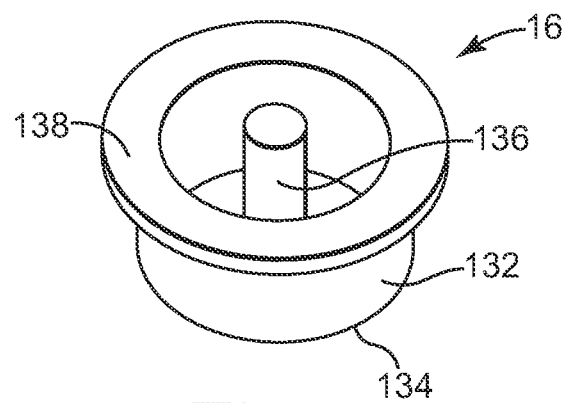
FIG. 4 is a bottom, perspective view of one embodiment of a button of a stored-value card, according to the present invention.

FIG. 4 illustrates a perspective view of one embodiment of button 16 of stored-value card 10. Button 16 generally includes a relatively short hollow cylinder 132, an end wall 134, and a pin 136. End wall 134 extends across one end of hollow cylinder 132. Pin 136 extends from end wall 134 through the center of cylinder 132. In one embodiment, pin 136 extends from end wall 134 a distance further than cylinder 132 extends from end wall 134. Pin 136 is relatively rigid. A ring or rim 138 extends about the perimeter of cylinder 132 on an end opposite end wall 134. More particularly, rim 138 extends radially outwardly from cylinder 132 and, therefore, has a larger diameter than cylinder 132. Cylinder 132 is sized with a diameter sufficient to fit within button aperture 98. Conversely, rim 138 has a diameter greater than the overall diameter of button aperture 98 and raised rim 100 of cover 26.

Figure 5:
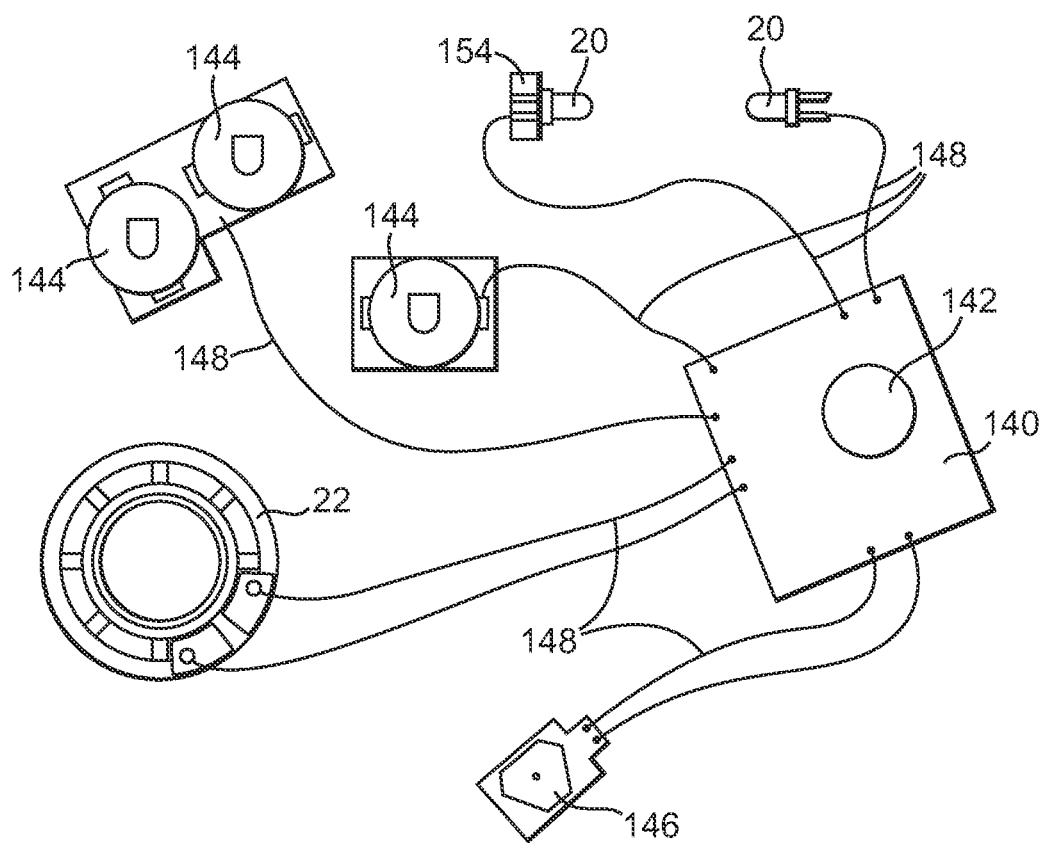
FIG. 5 is a top view of one embodiment of an electrical assembly of a stored-value card, according to the present invention.

As illustrated in FIG. 5 and in the block diagram of FIG. 5A, electrical assembly 14 includes a printed circuit board (PCB) 140, an integrated circuit or chip 142, at least one battery 144, a switch 146, light(s) 20, and speaker 22. Integrated circuit 142 is mounted to PCB 140. Integrated circuit 142 is electrically coupled to each of the other components 144, 146, 20, and 22 of electrical circuit 14 via a plurality of connector wires 148. In one embodiment, PCB 140 includes electrical traces, one or more resistors, one or more capacitors, and/or any suitable number of other electrical components facilitating the proper function of electrical assembly 14 and/or electrical connection of electrical components to integrated circuit 142. In one embodiment, each component 142, 144, 146, 20, and/or 22 is mounted to a PCB similar to but larger than PCB 140.

In one embodiment, integrated circuit 142 includes a memory 150, e.g. read-only memory (ROM) or other suitable memory. Integrated circuit 142 is programmed during manufacturing to store a digitized sound recording or audio file 152 to memory 150. In one embodiment, audio file 152 relates to and/or is readily identifiable as being associated with at least a portion of decorative indicia 114 of face panel 18. Accordingly, audio file 152 is one example of means for associating stored-value card 10 with at least one of a product brand, a store, a holiday, a season, an occasion, media format indicia, a sport, etc.

During use, integrated circuit 142 is configured to generate or produce audio file 152. Integrated circuit 142, and more particularly, memory 150, is one example of means for storing a sound file associated with stored-value card 10. Integrated circuit 142 also facilitates and/or regulates the flow of electric current from the at least one battery 144 to the at least one light 20. In one embodiment, integrated circuit 142 and/or light 20 includes a timer (not shown) for regulating the length of time light 20 is illuminated following depression of switch 146. In one example, the current drawn by integrated circuit 142 during times of non-illumination and non-playing of audio file 152, is sufficiently low to allow, for a number of months or years, the at least one battery 144 to provide power to electrical assembly 14.

In one embodiment, voice integrated circuit 142 additionally includes a recording element 156 configured to record personalized messages for subsequent replay to the recipient of stored-value card 10. Recording element 156 includes or is coupled to a microphone or other suitable recording device for receiving an audio message. Upon depression of switch 146 or a second switch similar to switch 146, recording element 156 is activated to capture a personalized audio message spoken or played generally toward stored-value card 10. The personalized audio message is stored to memory 150 as audio file 152 and is played back to the bearer upon depression of switch 146. For instance, the personalized audio message may wish a particular recipient congratulations, happy birthday, good wishes, etc. in a personalized manner not generally available from audio files 152 recorded during manufacturing of stored-value card 10 as described above.

Battery 144 provides electrical power to the other components 146, 142, 20, and 22 of electrical circuit 14. In one embodiment, battery 144 is an alkaline battery such as a standard AG10 1.5 volt battery or any other suitable battery. In one embodiment, switch 146 is a snap or pressure sensitive switch. Depression of switch 146 serves to close electrical circuit 14 and to activate integrated circuit 142, which in turn forwards audio file 152 or a representation thereof to speaker 22 to be played and forwards electric current from battery 144 to lights 20 to effectuate illumination of stored-value card 10.

Speaker 22 is any suitable speaker capable of converting the audio file 152 received from integrated circuit 142 into sound waves perceivable by the bearer of stored-value card 10, e.g. the customer and/or recipient. For example, speaker 22 is a 27 mm speaker or any other suitably sized speaker 22. Integrated circuit 142 and speaker 22 are one example of means for generating sound within stored-value card 10.

In one embodiment, each light 20 includes a light-emitting diode (LED), although any other suitable source of illumination may be alternatively or additionally utilized. Light 20 is one of a clear or colored light. Although two lights 20 are illustrated, use of any other suitable number of lights 20 is also contemplated. Lights 20 are one example of means for selectively illuminating at least a portion of stored-value card 10. In one embodiment, electrical assembly 14 includes a mounting block 154 coupled to one of light 20 to facilitate coupling of light 20 to housing 12, as will be described below.

As illustrated with reference to FIG. 1, in one embodiment, stored-value card 10 includes one or more of a color filter 160, a diffuser or diffusive sheet 162, and/or a light directing device 164. Color filter 160 is generally similarly shaped as light aperture 96 of cover 26, but color filter 160 is generally slightly larger than light aperture 96. Color filter 160 alters light that passes through color filter 160, for example by blocking one or more light wavelengths from being emitted through color filter 160. By blocking certain wavelengths and permitting other wavelengths to pass, color filter 160 alters the color of light to be emitted from stored-value card 10. In one embodiment, color filter 160 is a colored piece of cellophane, translucent plastic, or other suitable filters.

Diffusive sheet 162 is generally similarly shaped as light aperture 96 of cover 26, but diffusive sheet 162 is generally slightly larger than light aperture 95. Diffusive sheet 162 generally diffuses light emitted from light 20 and that passes through diffusive sheet 162 to more evenly emit light through light aperture 96 and out of stored-value card 10. In one example, diffusive sheet 162 includes black or other light blocking strips 166 longitudinally extending along one or both sides of diffusive sheet 162. Light blocking strips 166 block light from being emitted through the strip(s) 166 and, in one embodiment, cause light emitted from light 20 to be more precisely directed through other areas of diffusive sheet 162.

Figure 6:
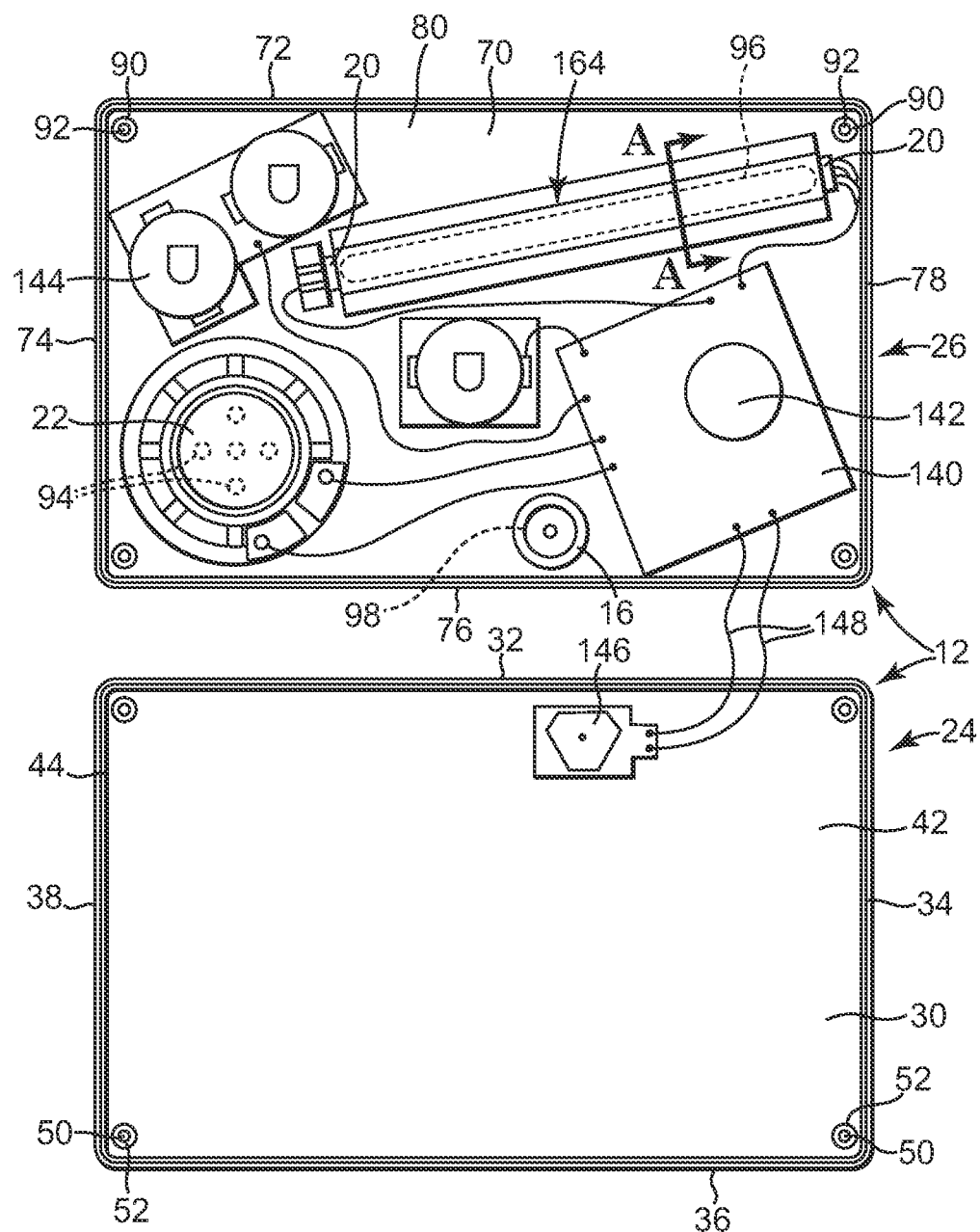
FIG. 6 is a top view of one embodiment of a partially assembled stored-value card, according to the present invention.
Figure 6A:
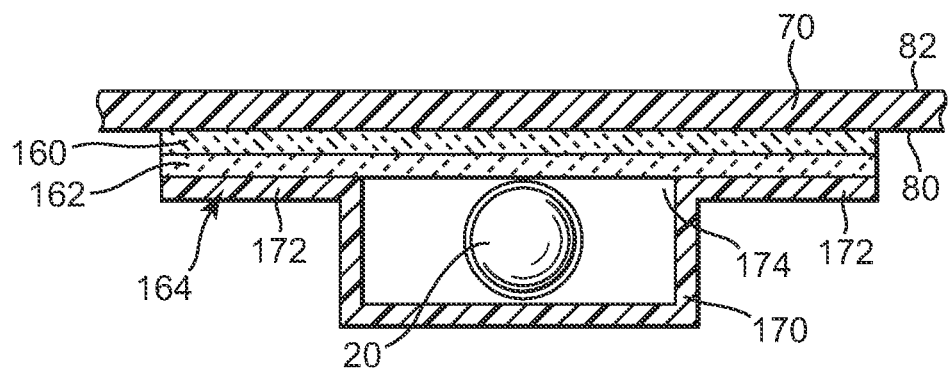
FIG. 6A is a cross-sectional view of FIG. 6 taken along the line A-A.

Light directing device 164 generally prevents or decreases light emitted from light 20 from being emitted and scattered throughout the inside of housing 12 and, rather, directs light to be emitted through light aperture 96 of cover 26. In one example, light directing device 164 defines a U-shaped portion 170 and connection tabs 172, as illustrated with additional reference to FIG. 6A. U-shaped portion 170 is configured to reflect light from light 20 towards an opening 174 of U-shaped portion 170, which aligns with light aperture 96 of cover 26 upon assembly of stored-value card 10. Each connection tab 172 extends longitudinally along an opposite side of U-shaped portion 170 and are configured to be coupled to housing 12 of stored-value card 10.

During assembly, electrical assembly 14 is coupled to housing 12. In particular, PCB 140 supporting integrated circuit 142 is adhered to cover 26. The at least one light 20 is coupled to cover 26 to generally correspond with light aperture 96. More specifically, in one example, a first light 20 is coupled to cover 26 near a first end of the elongated light aperture 96, and a second light 20 is coupled to cover 26 near a second end of the light aperture 96. In one example, each light 20 is directed toward the light aperture 96. In one embodiment, at least one light 20 is mounted to cover 26 by being adhered to mounting block 154, which is adhered to cover 26. In one embodiment, at least one light 20 is coupled to a side wall 72, 74, 76, or 78 of cover 26. Each of mounting block 154 and/or side wall 72, 74, 76, or 78 serves to maintain any of the respective lights 20 spaced slightly from primary panel 70.

The at least one battery 144 is coupled to cover 26 in areas not already occupied by PCB 140, speaker 22, and lights 20. In one embodiment, the at least one battery 144 is generally positioned so as not to interfere with light dispersion between the two lights 20 and/or through light aperture 96 of cover 26. In other embodiments, components 140, 142, 144, 146, 20, 22 are adhered to cover 26 rather than base 24 and/or vice versa.

In one example, switch 146 is coupled to base 24 to align with button aperture 98 upon assembly. Accordingly, button 16 is positioned within button aperture 98 to align with switch 146 upon assembly of stored-value card 10. More specifically, cylinder 132 of button 16 fits within rim 100 about button aperture 98 and rim 138 of button 16 interfaces with and extends over rim 100 of button aperture 98, thereby coupling button 16 to cover 26. In this respect, rim 138 of button generally prevents button 16 from falling though button aperture 98 towards the outside of cover 26.

In one embodiment, color filter 160 is coupled to cover 26 between lights 20 to extend across light aperture 96 of cover 26. Diffuser 162 is coupled to cover 26 and/or color filter 160 to extend across light aperture 96. In one embodiment, only one of color filter 160 and diffuser 162 are included and extend across light aperture 96. For example, in one embodiment, lights 20 are colored lights and, therefore, color filter 160 is emitted from stored-value card 10.

Light directing device 164 is coupled to cover 26, color filter 160, and/or diffuser 162 and also extends across light aperture. In particular, light directing device 164 is positioned such that each light 20 fits at least partially within U-shaped portion 170 with opening 174 of U-shaped portion 170 being directed toward light aperture 96 of cover 26. Once positioned, connection tabs 172 of light directing device 164 are adhered to cover 26 directly and/or via color filter 160 and/or diffuser 162. Accordingly, when illuminated, light is emitted from light 20, a portion of the light is reflected off of internal surfaces of light directing device 164 and directed toward light aperture 96. The directed light passes through diffuser 162 and color filter 160 to exit stored-value card 10 as a generally even emission of colored light through light aperture 96.

Once electrical assembly 14, button 16, color filter 160, diffuser 162, and/or light directing device 164 are in place within housing 12, cover 26 is placed upon base 24, or vice versa. Accordingly, base 24 is placed on cover 26 such that inside edge 44 of base 24 interfaces with inside edge 84 of cover 26. More specifically, first portion 46 and second portion 48 of inside edge 44 interface with first portion 86 and second portion 88 of inside edge 84, respectively. The stepped interface provides for a stable and generally neat coupling of base 24 and cover 26.

Once base 24 and cover 26 are mated, each aperture 50 in base 24 generally aligns with one of the plurality of threaded cavities 92 in cover 26, and button 16 generally aligns with switch 146 of electrical assembly 14. More specifically, pin 136 of button 16 is generally centered on switch 146. Attachment mechanisms, such as screws 180, are threaded through apertures 50 and into threaded cavities 92. In this respect, base 24 is secured to cover 26. Other methods of securing base 24 to cover 26 are also contemplated. In one embodiment, assembled housing 12 is generally about 54 mm wide, about 85.6 mm long, and about 7 mm thick.

Once base 24 is secured to cover 26, face panel 18 is applied to outside surface 80 of cover 26. In particular, face panel 18 is fit and adhered within panel indentation 102 to generally align speaker apertures 120 of face panel 18 with speaker apertures 94 of cover 26. Light aperture 122 of face panel 18 is generally aligned with light aperture 96 of cover 26. When aligned and placed on cover 26, button indicator 118 generally aligns with button 16. In one embodiment, face panel 18 is also adhered to end wall 134 of button 16. In other embodiments, face panel 18 is applied to cover 26 before assembling cover 26 with electrical assembly 14, button 16, or base 24. In other embodiments, face panel 18 is applied to cover 26 before assembling cover 26 with button 16 and/or base 24.

Upon assembly, stored-value card 10 functions to both amuse the bearer, e.g. the consumer or the recipient, and to entice consumers to purchase stored-value card 10. In particular, upon a consumer or recipient pressing face panel 18 in a position corresponding with button indicator 118, button 16 is depressed thereby also depressing switch 146 of electrical assembly 14. Depression of switch 146 causes the audio file stored to integrated circuit 142 to be played via speaker 22 and lights 20 to be illuminated. The audio file sound waves travel through stored-value card 10, in particular, speaker apertures 94 and 120, and the light emitted escapes through light apertures 96 and 122 to reach the bearer of stored-value card 10. Therefore, the bearer is presented with both a stored-value card and a source of additional amusement. Face panel 18, button 16, and/or switch 146 are examples of means for activating stored-value card 10 to play audio file 152 and to illuminate light 20.

In particular, additionally referring to FIGS. 5 and 5A, depression of switch 146 closes the electrical circuit of electrical assembly 14, thereby drawing current from the at least one battery 144 to integrated circuit 142. Electrical signals corresponding to audio file 152 of integrated circuit 142 are sent to speaker 22, thereby driving speaker 22 to produce sound waves corresponding with audio file 152. The sound waves travel through stored-value card 10, in particular, apertures 114 and 130, to reach the customer, recipient, or other bearer of stored-value card 10. In additional, integrated circuit 142 forwards electrical current to lights 20, thereby illuminating lights 20, which in turn illuminate decorative indicia 114 visible to the card bearer.

When audio file 152 is finished playing and lights 20 are finished illuminating, integrated circuit 142 automatically deactivates or shuts off. In one embodiment, the current drawn by integrated circuit 142 during its inactive state is sufficiently low to allow the at least one battery 144 to provide power to audio circuit 14 for a number of months or years. Accordingly, the customer and/or recipient are presented with both a stored-value card and a source of additional amusement.

In particular, in one embodiment, the source of additional amusement is a collective audio and visual presentation provided by viewing decorative indicia 124 and illumination from light 20 and hearing audio file 152. For instance, in the illustrated embodiment, the decorative indicia 124 includes a character, for example, a warrior having a sword that is illuminated by light 20, and the audio file 152 includes an audible expression readily associated with the character, for example, a characteristic quote or manner of breathing. As such, the lighted character and the audible expression provide an audio and visual presentation that amuses the bearer of stored-value card 10. Use of other characters, e.g. characters from movies, books, television, video games, characters representing other life events, clip art, etc., and other audible expressions, e.g. quotes, laughs, songs, etc., are also contemplated. In one embodiment, the collective audio and visual presentation of stored-value card 10 in a retail setting entices potential consumers to purchase and/or load stored-value card 10.

Figure 7A:
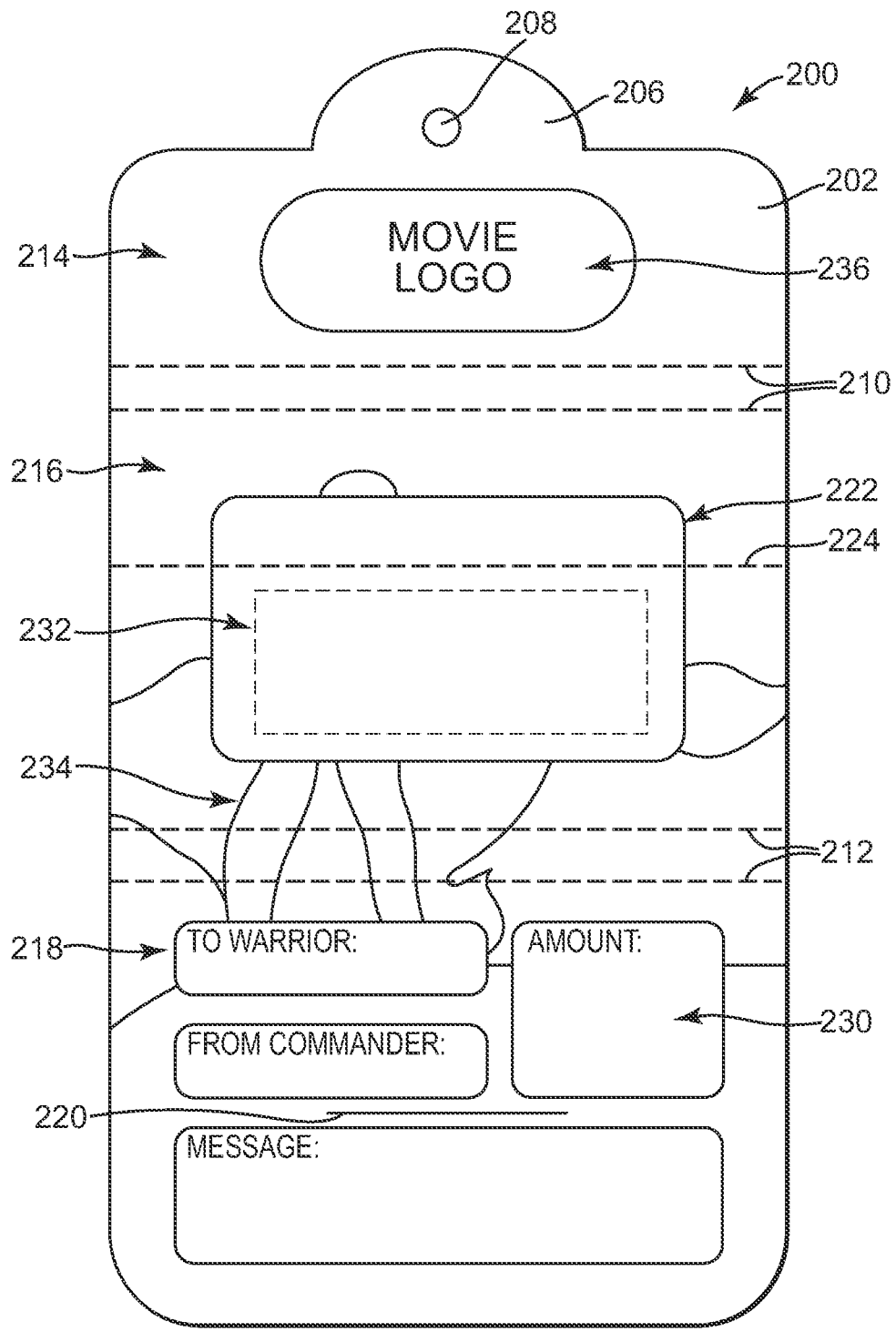
FIG. 7A is a front view of one embodiment of an unfolded carrier for a stored-value card, according to the present invention.
Figure 7B:
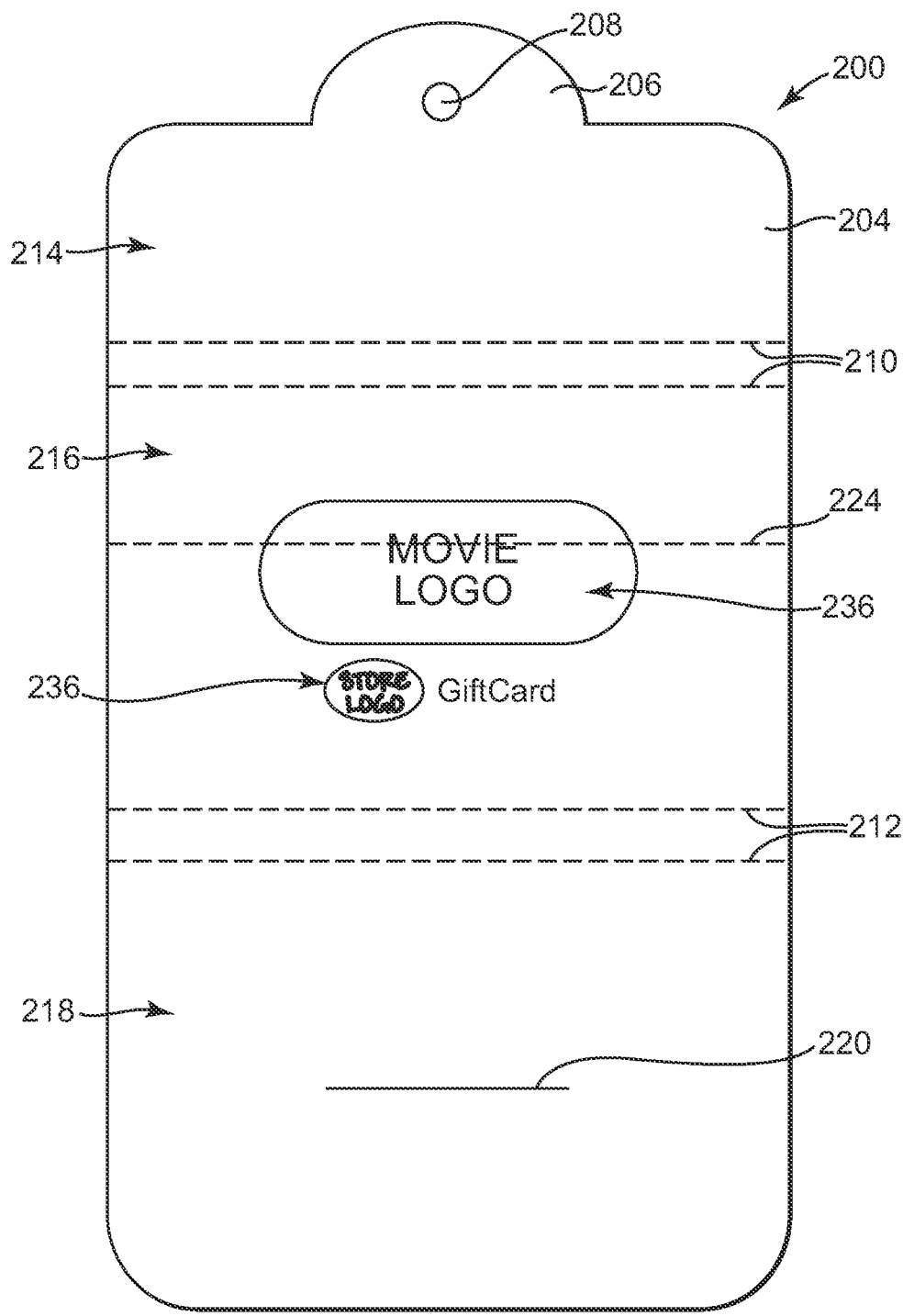
FIG. 7B is a back view of the unfolded carrier of FIG. 7A.

FIGS. 7A and 7B illustrate a carrier or backer 200 for supporting stored-value card 10 in an unfolded or open configuration. Backer 200 comprises a single layer or multiple layers of paper or plastic material, for example, generally in the form of a relatively stiff but bendable/flexible card. Other materials are also contemplated. In one embodiment, backer 200 is a generally planar substrate having a generally elongated or rectangular shape. Accordingly, backer 200 defines a first surface 202 (FIG. 7A) and a second surface 204 (FIG. 7B) opposite first surface 202. A tab 206 is generally centered at a first lateral end of backer 200. In one example, a support arm aperture 208 is defined within tab 206 and is configured to receive a support arm or hook. As such, an open backer 200 can be hung on the support arm or hook for display in a retail store.

Fold lines 210 and 212 each extend laterally across backer 200 and are spaced longitudinally from one another. More specifically, fold lines 210 are positioned relatively near tab 206 as compared to fold lines 212. A first panel 214, a second or intermediate panel 216, and a third panel 218 are defined by the position of fold lines 210 and 212. First panel 214 extends from fold lines 210 away from fold line 212 and includes tab 206. Second or intermediate panel 216 extends between fold lines 210 and 212. Third panel 218 extends from fold lines 212 in a direction opposite fold lines 210. A laterally extending slit 220 is laterally centered on third panel 216.

In one example, first surface 202 includes indicia 222 generally indicating where stored-value card 10 (illustrated in FIG. 1) will be adhered to first surface 202 of intermediate panel 216. Accordingly, indicia 222 are longitudinally centered on intermediate panel 216. In one embodiment, backer 200 additionally includes a fold line 224 laterally extending across intermediate panel 216, more particularly across indicia 222 of intermediate panel 216.

In one embodiment, backer 200 displays additional indicia, graphics or text information including store logo(s), store name(s), slogans, advertising, instructions, directions, brand indicia, promotional information, media format identifiers (e.g. characters, logos, scenes, or other illustrations relating to at least one of a movie, television show, book, etc.), characters, and/or other information. For example, first surface 202 includes indicia 230, 232, 234, and/or 236. Indicia 230 include to, from, initial gift card value, and message fields. In one embodiment, captions within the fields of indicia 230 are related to indicia 114 of stored-value card 10. In one example, where decorative indicia 114 illustrate a warrior, the captions of indicia 230 may include phrases such as "To Warrior" and "From Commander," etc.

Indicia 232, which are generally depicted as a dashed box in FIG. 7A, indicate that stored-value card 10 is redeemable for the purchase of goods and/or services and that, upon use, a value of the purchased goods and/or services will be deducted from the financial account or record linked to stored-value card 10. In one embodiment, indicia 232 include phrases such as "<NAME OF STORE> GiftCard" and "This GiftCard is redeemable for merchandise or services at any of our stores or at our website," and/or provides help or phone line information in case of a lost, stolen, or damaged stored-value card 10, etc. In one example, indicia 232 include the following or a similar statement:

This GiftCard is redeemable for merchandise or services at any of our stores or at our web site. This GiftCard is not redeemable for cash or credit except where required by law. No value until purchased. For balance information or to report a lost, stolen or damaged card, call 1-800-555-5555. We can replace the remaining value on a lost, stolen or damaged card with the original purchase receipt.

Indicia 234 are decorative indicia that generally improve the aesthetic appeal of backer 200. In one embodiment, decorative indicia 234 are positioned and configured to correspond with or incorporate decorative indicia 114 of stored-value card 10 upon placement of stored-value card 10 on backer 200 as will be further described below.

Indicia 236 identify a store, brand, department, media title or logo, e.g. a title or logo of a move, book television show, video game, etc. associated with stored-value card 10, etc. In one embodiment, indicia 236 are additionally or alternatively included on first surface 202 and second surface 204 of backer 200. Additional information besides that specifically described and illustrated herein also may be included. Other indicia, e.g. indicia promoting that stored-value card 10 includes a playable sound or audible file and/or that stored-value card 10 includes a light or that value can always be reloaded to stored-value card 10, are also contemplated. Any of indicia 230, 232, 234, 236, or other indicia, optionally may appear anywhere on backer 200 or stored-value card 10.

Figure 8A:
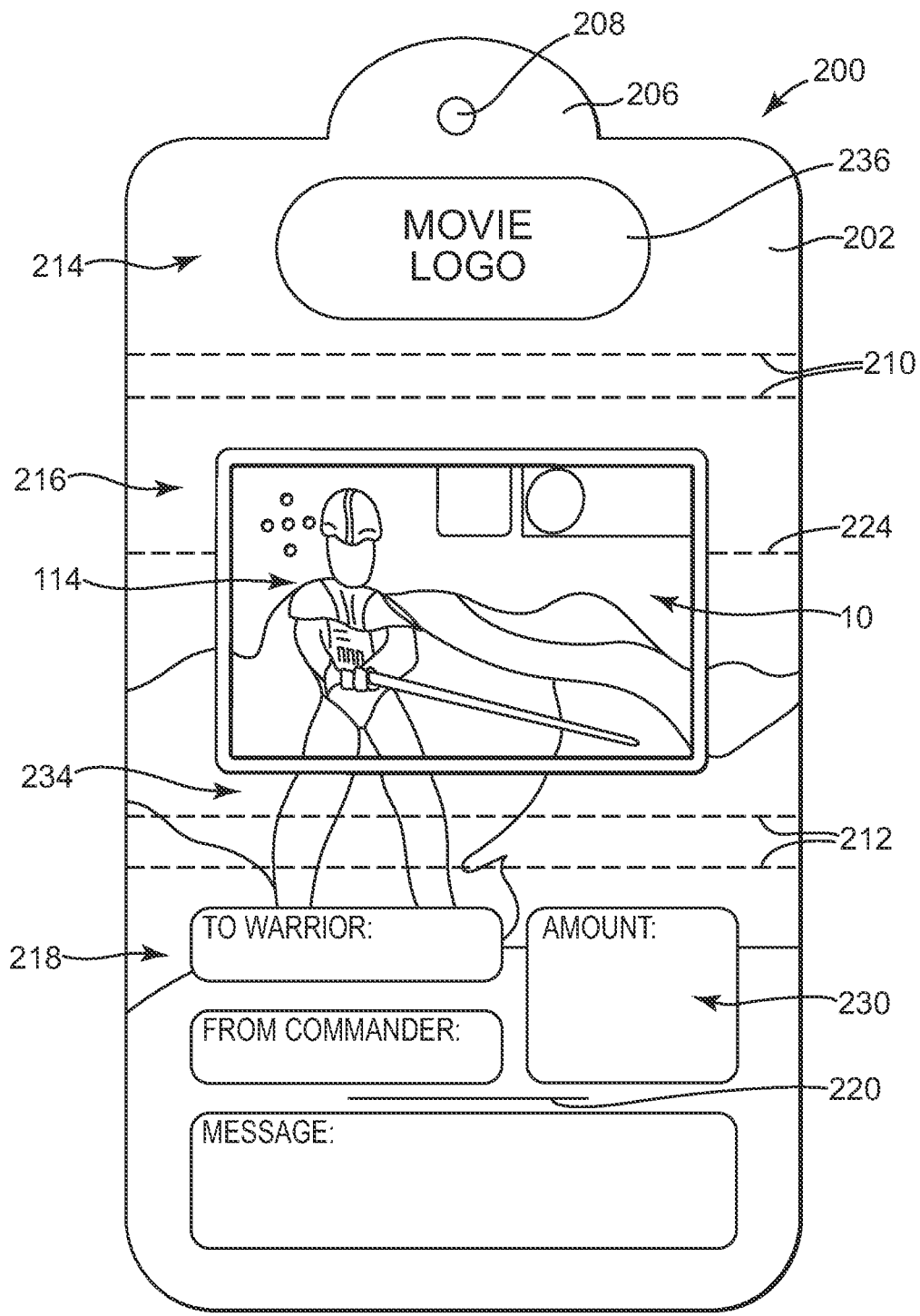
FIG. 8A is a front view of the unfolded carrier of FIG. 7A supporting a stored-value card, according to the present invention.
Figure 8B:
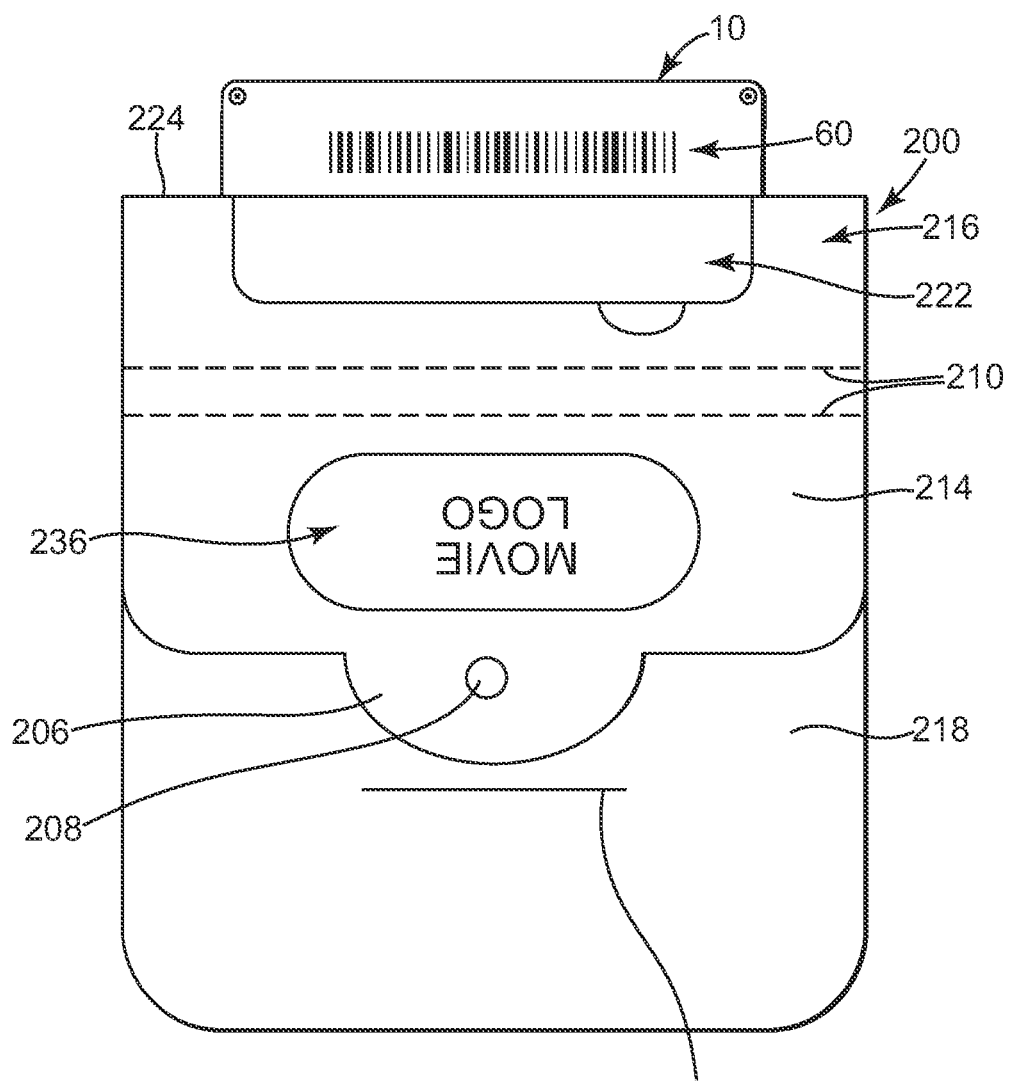
FIG. 8B is a back view of the carrier of FIG. 7A partially folded and supporting a stored-value card, according to the present invention.

Backer 200 is configured to receive stored-value card 10 on first surface 202 of intermediate panel 216 as illustrated with additional reference to FIGS. 8A and 8B. In particular, stored-value card 10 is releasably adhered or otherwise secured to intermediate panel 216 as indicated by indicia 222 (illustrated in FIG. 7A). In one example, once stored-value card 10 is secured to backer 200, decorative indicia 114 of stored-value card 10 coordinate with decorative indicia 234 of backer 200. For example, as illustrated in FIG. 8A, decorative indicia 114 of stored-value card 10 illustrate a first portion of a warrior scene and decorative indicia 234 illustrate a second portion of the warrior scene. Accordingly, decorative indicia 114 and 234 collectively illustrate a larger warrior scene than either of decorative indicia 114 or 234 illustrate alone.

In one embodiment, backer 200 is hung from a support arm or hook for display in a retail setting in a manner in which at least stored-value card 10 and a portion of first surface 202 of backer 200 is visible to potential consumers. In this manner, potential consumers are able to depress button 16 of stored-value card 10 to be provided with the audio and visual presentation, which entices the potential consumer to purchase stored-value card 10.

During purchase, first panel 214 and an adjacent portion of intermediate panel 216 are folded back about fold line 224 as illustrated in FIG. 8B to expose a portion of outside surface 40 of stored-value card 10. In particular, the exposed portion of outside surface 40 includes account identifier 60. As previously described, account identifier 60 is adapted for accessing a financial account or record associated with stored-value card 10 for activating, loading, or debiting from the account or record. Accordingly, by folding backer 200 about fold line 224, account identifier 60 is accessible to activate and/or load stored-value card 10 without removing stored-value card 10 from backer 200.

Backer 200 is configured such that after purchase first panel 214 and third panel 218 are foldable about fold lines 210 and 212, respectively, to enclose or selectively wrap stored-value card 10 as desired. More particularly, third panel 218 is rotated about fold lines 212 so that first surface 202 of third panel 218 is moved towards first surface 202 of intermediate panel 216. Then, first panel 214 is rotated about fold lines 210 so that first surface 202 of first panel 214 is moved toward first surface 202 of intermediate panel 216. In one embodiment, each fold line 210 and 212 includes two longitudinally spaced fold lines to more easily accommodate the thickness of stored-value card 10 when backer 200 is in a folded position. In this respect, first panel 214 at least partially overlaps third panel 218. Tab 206 is slid into slit 220 of third panel 218 to selectively lock backer 200 in a folded or closed position (not shown) about stored-value card 10. Folding of first and third panels 214 and 218 of backer 200 in the opposite directions about fold lines 210 and 212 for display in a retail store is also contemplated.

When in the folded position, stored-value card 10 is selectively wrapped for presentation to a recipient of stored-value card 10. Upon receipt, the recipient unfolds backer 200 to access stored-value card 10. Accordingly, recipient or other bearer can depress button 16 to be provided with and amused by the audio and visual presentation of stored-value card 10. Backers similar to backer 200 can be used with various sizes and shapes of stored-value card 10. Other backers or packages are also contemplated for supporting stored-value card 10.

Stored-value cards come in many forms, according to embodiments of the invention. The gift card, like other stored-value cards, can be "re-charged" or "reloaded" at the direction of the original consumer, the gift recipient, or third party. The term "loading on" or "loaded on" herein should be interpreted to include adding to the balance of a financial account or record associated with a stored-value card. The balance associated with a stored-value card declines as the card is used, encouraging repeat visits. The card remains in the user's purse or wallet, serving as an advertisement or reminder to re-visit the associated merchant. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, pre-paid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, stored-value card 10 optionally is a physical card made of plastic, paper, generally stiff paper, other substrate, or the like. Adding value to stored-value card 10 optionally includes adding either a fixed amount or an amount that can be chosen by the customer or other user. Other modifications within the scope of the invention in its various embodiments will be apparent to those of ordinary skill.

What is claimed is:

1. A financial transaction card comprising:
    a first member defining a first panel, the first panel being substantially planar;
    a second member defining a second panel, the second panel being substantially planar, and the second member being formed as a separate piece as compared to the first member, wherein the first panel and the second panel are substantially parallel to one another, and each of the first panel and the second panel define at least a portion of an external surface of the financial transaction card;
    a side wall extending between the first panel and the second panel such that the first panel is spaced from the second panel to define a void between the first panel and the second panel, wherein the side wall is partially formed by each of the first member and the second member, and the first member and the second member interface in a stepped configuration and directly abut one another in the stepped configuration;
    at least one substantially rigid connection member extending through the first member and interfacing with the second member to at least partially couple the first member to the second member; and
    an account identifier associating the financial transaction card with an account or record having a value associated therewith such that the financial transaction card is configured for use toward the purchase price of one or more of goods and services.

2. The financial transaction card of claim 1, wherein the side wall extends around a substantial entirety of a perimeter of each of the first panel and the second panel.

3. The financial transaction card of claim 1, wherein the at least one substantially rigid connection member is a screw.

4. The financial transaction card of claim 1, wherein the at least one substantially rigid connection member extends with an orientation substantially perpendicular to the first panel and the second panel.

5. The financial transaction card of claim 1, wherein the side wall extends in a direction substantially perpendicular to an extension of the first panel and the second panel.

6. The financial transaction card of claim 1, further comprising an object, wherein the object is positioned within a portion of the void.

7. The financial transaction card of claim 6, wherein at least portions of the void remain unoccupied when the first member is coupled to the second member via the at least one substantially rigid connection member.

8. The financial transaction card of claim 1, wherein the side wall is substantially planar and defines an inside surface immediately adjacent the void and an outside surface positioned opposite the inside surface and on an exterior of the financial transaction card.

9. The financial transaction card of claim 1, wherein:
    the at least one substantially rigid connection member extends from the at least the portion of the external surface defined by the first panel to interface with the second member.

10. The financial transaction card of claim 9, wherein:
    the second panel defines an inside surface;
    the second member includes at least one protrusion extending away from the inside surface of the second panel into the void;
    the at least one protrusion defines a threaded internal cavity; and
    the at least one substantially rigid connection member extends through the first panel and into the threaded internal cavity of the at least one protrusion to couple the first member with the second member.

11. The financial transaction card of claim 10, wherein each of the first member and the second member are formed as a single piece of plastic.

12. The financial transaction card of claim 10, wherein one of the first panel and the second panel defines an aperture.

13. The financial transaction card of claim 12, further comprising a button extending from the void and through the aperture.

14. The financial transaction card of claim 12, further comprising one or more lights positioned within the void near the aperture such that illumination from the lights is visible from a vantage point external to the financial transaction card via the aperture.

15. The financial transaction card of claim 1, wherein the account identifier is a bar code printed to the external surface.

* * * * *